US011420261B2

(12) United States Patent
Herzog et al.

(10) Patent No.: US 11,420,261 B2
(45) Date of Patent: Aug. 23, 2022

(54) SYSTEM FOR PRODUCING THREE-DIMENSIONAL OBJECTS

(71) Applicant: CL SCHUTZRECHTSVERWALTUNGS GMBH, Lichtenfels (DE)

(72) Inventors: Frank Herzog, Lichtenfels (DE); Florian Bechmann, Lichtenfels (DE); Fabian Zeulner, Lichtenfels (DE); Jens Stammberger, Rödental (DE); Christian Diller, Lichtenfels (DE); Ralf Hetzel, Bad Staffelstein (DE)

(73) Assignee: CONCEPT LASER GMBH, Lichtenfels (DE)

( * ) Notice: Subject to any disclaimer, the term of this patent is extended or adjusted under 35 U.S.C. 154(b) by 603 days.

(21) Appl. No.: 15/762,950

(22) PCT Filed: Sep. 22, 2016

(86) PCT No.: PCT/EP2016/072489
§ 371 (c)(1),
(2) Date: Mar. 23, 2018

(87) PCT Pub. No.: WO2017/050860
PCT Pub. Date: Mar. 30, 2017

(65) Prior Publication Data
US 2018/0304529 A1    Oct. 25, 2018

(30) Foreign Application Priority Data
Sep. 25, 2015    (DE) .................. 102015116282.2

(51) Int. Cl.
B29C 64/153    (2017.01)
B33Y 30/00    (2015.01)
(Continued)

(52) U.S. Cl.
CPC ............... *B22F 12/00* (2021.01); *B22F 3/24* (2013.01); *B29C 64/153* (2017.08);
(Continued)

(58) Field of Classification Search
CPC ... B29C 64/379; B29C 64/153; B29C 64/227; B22F 3/1055; B22F 2003/1059
See application file for complete search history.

(56) References Cited

U.S. PATENT DOCUMENTS 7,777,155 B2 * 8/2010 Twelves, Jr. ......... B23K 26/364
700/118
8,086,406 B2   12/2011 Ewerhart et al.
(Continued)

FOREIGN PATENT DOCUMENTS

CN    202594275 U    12/2012
DE    102009036153 A1    2/2011
(Continued)

OTHER PUBLICATIONS

PCT/EP2016/072489 International Search Report.
(Continued)

Primary Examiner — Alison L Hindenlang
Assistant Examiner — Debjani Roy
(74) Attorney, Agent, or Firm — Dority & Manning, P.A.

(57) ABSTRACT

A system (1) for producing three-dimensional objects (2) by way of the solidification above one another of layers of a building material which can be solidified by means of radiation at the points which correspond to the respective cross section of the object, wherein the system (1) comprises at least one process station (4) which is arranged in a first housing (3) for carrying out the layer-by-layer generative building process in a building container (5), and a handling station (7) in at least one second housing (6) for unpacking produced objects (2) from the building container (5) which (Continued)

can be moved between the at least one process station (4) and the at least one handling station (7), wherein the at least one process station (4) and the at least one handling station (7) are arranged in separate housing units (3, 6).

20 Claims, 8 Drawing Sheets

(51) Int. Cl.
| | | |
|---|---|---|
| *B22F 12/00* | (2021.01) | |
| *B33Y 10/00* | (2015.01) | |
| *B22F 3/24* | (2006.01) | |
| *B33Y 40/00* | (2020.01) | |
| *B29C 64/379* | (2017.01) | |
| *B22F 10/10* | (2021.01) | |

(52) U.S. Cl.
CPC ............ *B29C 64/379* (2017.08); *B33Y 10/00* (2014.12); *B33Y 30/00* (2014.12); *B33Y 40/00* (2014.12); *B22F 10/10* (2021.01); *B22F 2999/00* (2013.01); *Y02P 10/25* (2015.11)

(56) References Cited

U.S. PATENT DOCUMENTS

| | | |
|---|---|---|
| 8,951,033 B2 | 2/2015 | Hochsmann et al. |
| 9,456,884 B2 | 10/2016 | Uckelmann et al. |
| 9,505,173 B2 | 11/2016 | Maggiore |
| 2002/0179602 A1 | 12/2002 | Cocker et al. |
| 2012/0113439 A1* | 5/2012 | Ederer .................. C22C 1/1084 358/1.9 |
| 2012/0211155 A1* | 8/2012 | Wehning ............ A61C 13/0013 156/380.9 |
| 2013/0004607 A1 | 1/2013 | Hoechsmann et al. |
| 2015/0035206 A1 | 2/2015 | Maggiore |
| 2015/0183166 A1 | 7/2015 | Yoo et al. |
| 2016/0243618 A1* | 8/2016 | Heugel ................. B29C 64/165 |

FOREIGN PATENT DOCUMENTS

| | | | |
|---|---|---|---|
| DE | 102009036153 A1 | 2/2011 | |
| DE | 102009056696 A1 | 6/2011 | |
| DE | 102009056696 A1 | 6/2011 | |
| DE | 102013223411 A1 | 5/2015 | |
| DE | 102013223411 A1 | 5/2015 | |
| EP | 1961514 A2 | 8/2008 | |
| EP | 2926927 A2 | 10/2015 | |
| JP | H0453640 B2 * | 8/1992 | ........... B30B 11/002 |
| JP | 2015/193187 A | 11/2015 | |
| JP | 2015/531321 A | 11/2015 | |
| WO | WO2015/071183 A1 | 5/2015 | |

OTHER PUBLICATIONS

Machine Translated Japanese Search Report Corresponding to Application No. 2017558692 dated Nov. 27, 2018.
Machine Translated Chinese Search Report Corresponding to Application No. 201680018233 dated Jan. 18, 2019.
European Office Action Corresponding to Application No. 16781299 dated Jul. 29, 2020.

* cited by examiner

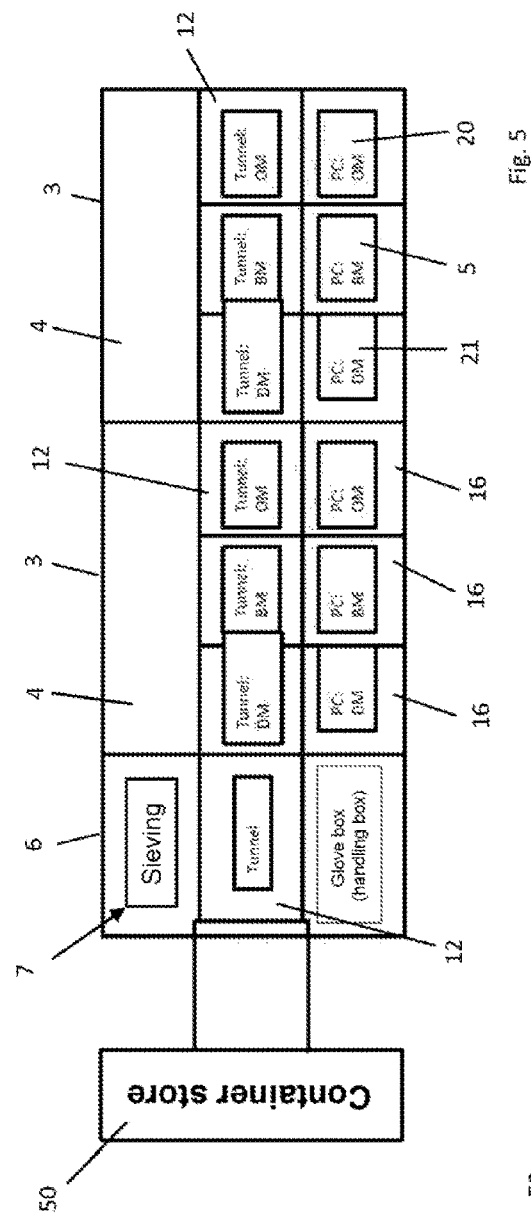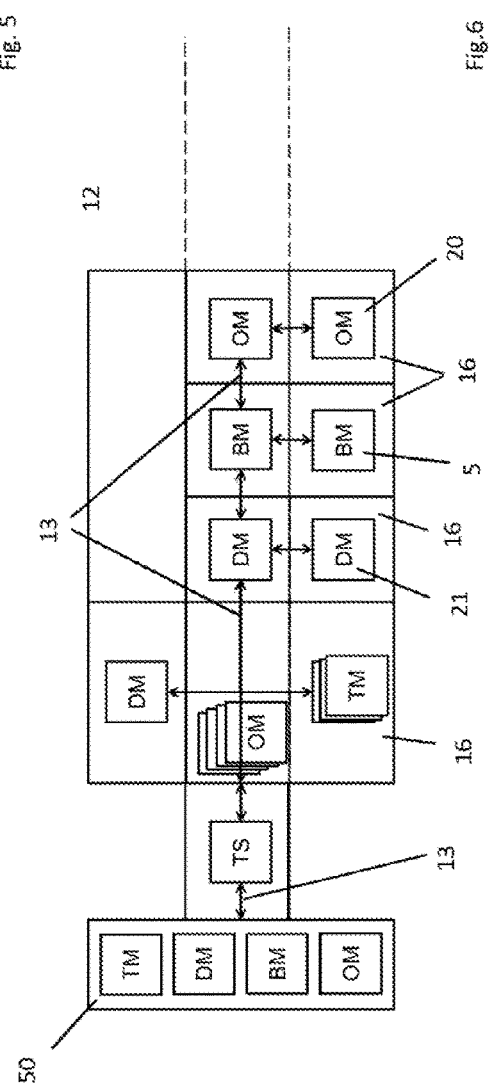

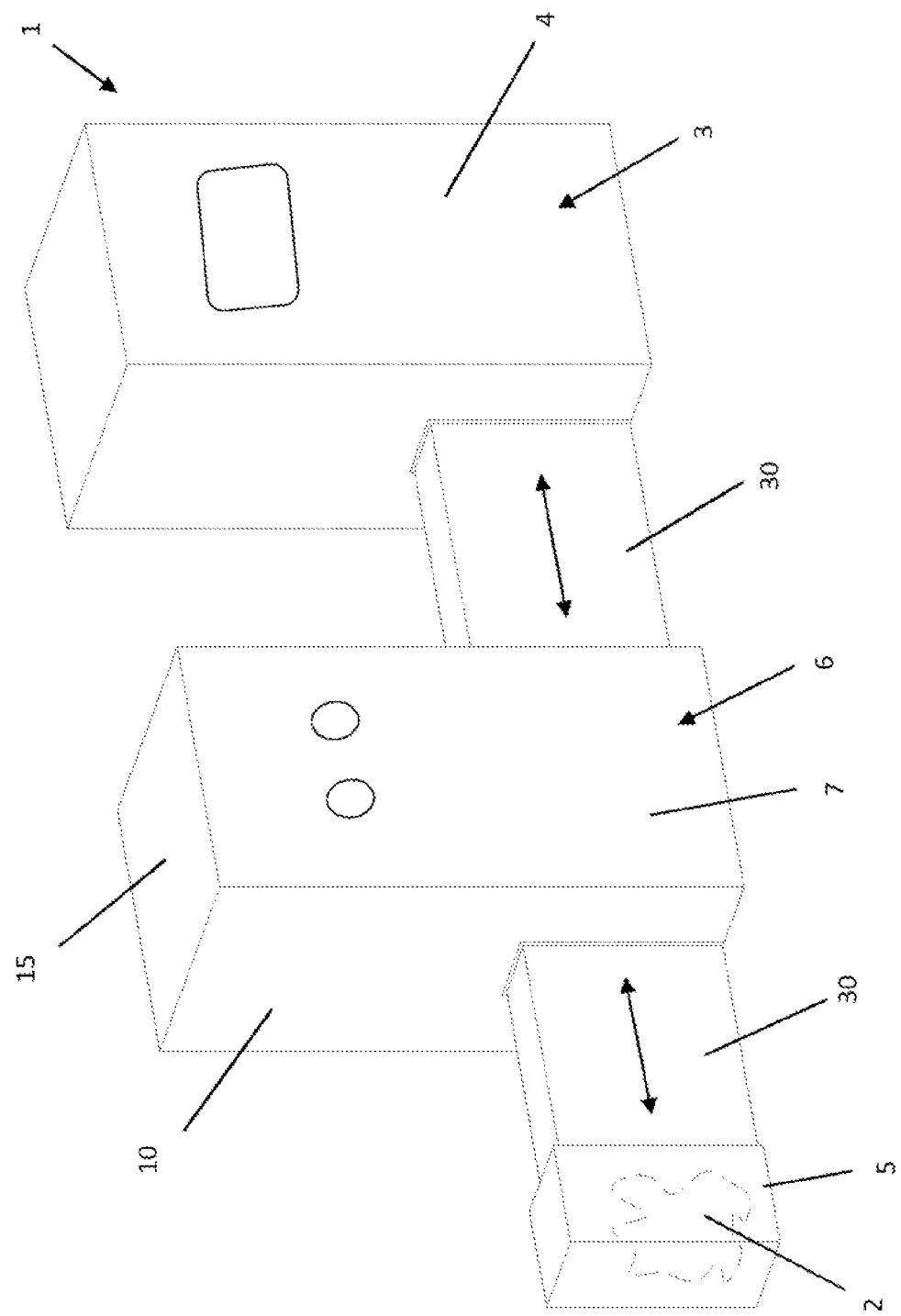

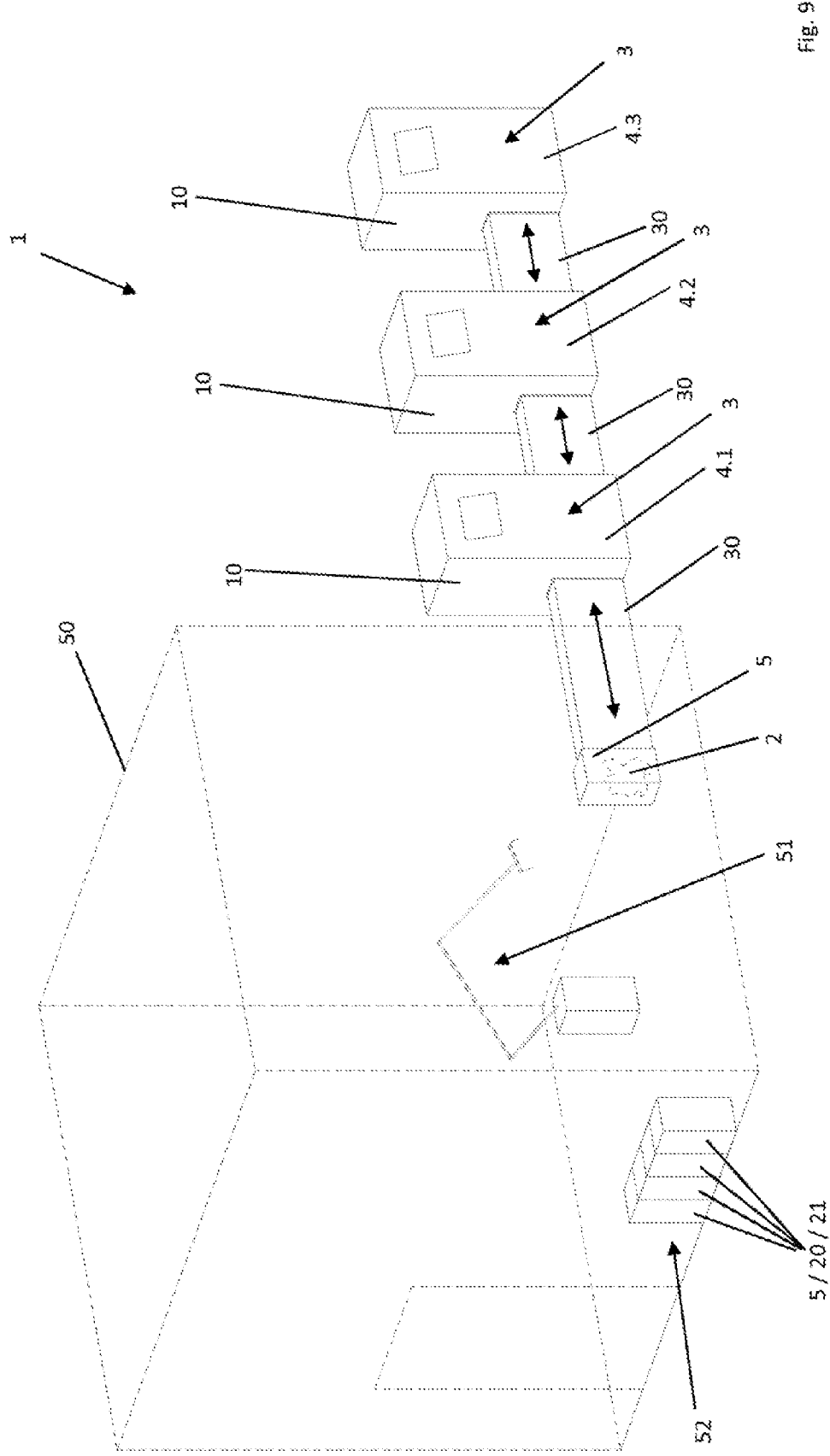

SYSTEM FOR PRODUCING THREE-DIMENSIONAL OBJECTS

CROSS-REFERENCE TO RELATED APPLICATIONS

This application is a United States national stage entry of an International Application serial no. PCT/EP2016/072489 filed Sep. 22, 2016 which claims priority to German Patent Application serial no. 10 2015 116 282.2 filed Sep. 25, 2015. The contents of these applications are incorporated herein by reference in their entirety as if set forth verbatim.

DESCRIPTION

The invention relates to a system for producing three-dimensional objects by means of successive setting of layers of a construction material, which can be set by means of, at the locations which correspond to the respective cross-section of the object. Such systems are also referred to as systems for the generative construction of objects and include so-called SLM (selective laser melting) or SLS (selective laser sintering) devices. However, the invention is not limited thereto, but instead also extends to other devices in which the construction material which is intended to be set is, for example, sprayed on the location which is intended to be constructed and is melted at that location, for example, by means of a laser beam and is set during solidification in order to form the component in a generative manner.

Known devices of this type generally comprise a process station in which the actual layered generative construction process is carried out, for which a construction container is used in most cases. It is also already known to arrange in a second housing or housing portion a handling station for unpacking produced objects from the construction container which can be displaced between the at least one process station and the at least one handling station. Such a device is disclosed, for example, in DE 20040547, in which there are provided in a coherent housing unit both a process station and a removal station, wherein the construction container can be moved back and forth between the two stations mentioned.

This known device is disadvantageous since it cannot be expanded as a self-contained unit.

DE 20140087 additionally discloses a device of the type mentioned with a plurality of handling stations which are arranged substantially beside each other and which are individually or together as handling modules arranged so as to be able to be displaced, rotated or pivoted relative to at least one construction chamber, but so as to be coupled thereto.

An object of the invention is to develop a system having the features according to the claims in such a manner that it can be used in a more variable manner, adapted to changing requirements within production operation and enables highly efficient rapid production.

This object is achieved with the characterizing features according to the claims, advantageous developments will be appreciated from dependent claims. The claims characterize the invention in terms of the method.

According to the teaching of the claims, in a first alternative both the process station and the at least one handling station are arranged in separate housing units which can be erected separately or individually. These housing units are provided in wall regions with supply openings and constructed in such a manner that they can form adjacent or juxtaposed or partially separated configuration at least one continuous tunnel or a tunnel chain, wherein the tunnel or the tunnel chain forms a travel path which is integrated in the housing units for construction containers and additional displaceable containers. In another alternative, it is within the scope of the invention to allow at least two housing units which each receive one or more process stations to extend through the tunnel or the tunnel chain.

It is therefore considered to be a central notion of the invention to construct within the housing units, which can be erected in a freely variable manner, can be assembled directly one on the other or can be provided with spacing from each other, a tunnel travel path which can be used not only for the construction container but also for additional containers. This means that, for example, on one and the same travel path, containers from a plurality of process stations can be displaced into a common handling station or a plurality of handling stations which are provided for this purpose. However, it is also possible, for example, to transport away overflow containers with excess construction material on this travel path or to introduce metering containers with fresh construction material into a process station. All this takes place within a tunnel.

It is further within the scope of the invention to provide only one juxtaposition of process stations and to arrange therein the tunnel or the tunnel portions and to connect them in a tunnel-like manner and to carry out the preparation of the construction containers or the removal of completed components, for example, using a robot in a large inerted space. This inerted space then acts almost as a handling station and is advantageously intended to be connected to the tunnel or the tunnel portions.

The tunnel concept, as intended to be used in the invention, has a plurality of advantages. On the one hand, there are no interactions and consequently also no risks between the displaceable containers and operators who have to remain in the periphery of such a system. The tunnel integration of the travel path in the device itself enables clean and conflict-free handling of the containers within the entire system.

The containers may be closable so that the protective gas atmosphere therein can be substantially maintained. However, it is also possible to flood the tunnels or the tunnel portions themselves with protective gas and to fit locks at the tunnel inlets and the tunnel outlets.

Wherever "additional containers" are mentioned, this then includes all container-like receptacles which are intended to be replaced or changed and which can be used or considered in such systems. In particular, metering containers for supplying the construction material to a coating device are intended, overflow containers for receiving excess construction material. However, there may also be displaced containers or "modules" which have no "filling" in the wider sense of the term, but which instead contain functional elements, such as, for example, service modules which, for example, can carry out a protective glass change automatically or cleaning modules or milling head modules or measurement head modules by means of which different cleaning, processing or measurement tasks can be carried out within the different stations. These modules may, for example, be displaced in the upper region, for example, suspended in the tunnel or the tunnel chain, whereas construction containers, overflow containers and metering containers can advantageously be supported on a, for example, rail-like travel path in the lower region of the tunnel. In principle, it is also within the scope of the invention to receive the containers or modules on transport paths which are provided with a self-drive drive mechanism and a control, for example, a hall type GPS control. However, the containers or modules may also be constructed with a self-drive drive mechanism, that is to say, find their own way to the correct location thereof in a process-controlled manner, but it is also possible to provide an advance transport system of any type which is securely integrated in the tunnel.

It is quite particularly advantageous for the travel path inside the tunnel always to be kept substantially free. This is because it is then possible to process free container module traffic at high speed, to this end the tunnel or the tunnel chain may, for example, be provided with side niches or bypass stations in which the movable containers or modules can be introduced in particular in an operating position or during a bypass operation for continuous release of the travel path which extends in the tunnel opening for further containers. For example, in a process station there is provided a side niche which receives a construction container and the metering container and the overflow container in the respective operating positions. The actual tunnel travel path is arranged in front of or behind these niches, additional containers can be sent through the released travel path at relatively high speed to additional juxtaposed process stations or handling stations.

The tunnel or the tunnel chain may be closed at one end; this improves the protective gas flooding possibilities. However, it is also possible, for example, at one end of the tunnel within a protective gas atmosphere to arrange a container magazine in which construction containers which are pre-flooded with protective gas are stored with already configured construction plates, metering containers or empty overflow containers and from there are introduced into the tunnel or the corresponding operating positions. From the other side, metering containers can be introduced or overflow containers can be moved out and emptied at that location. The tunnel does not necessarily have to have only one outlet or one inlet, it is also possible to provide side outlets and inlets in the tunnel in order to move containers over short paths to their respective work place or to start service modules from that location in order to shorten a service operation to the greatest possible extent.

In principle, it is possible to erect housing elements separately so that in the housing elements a tunnel chain is formed, or to connect the housing elements so that a continuous tunnel is formed within the housing elements.

However, it is also possible to fit between the individually erected housing elements of process stations or handling stations or other stations tunnel connection elements which may be linear or bent. It is also possible to construct the tunnel connection elements so as to be able to be flange-mounted on the housing inlets and outlets in a gas-tight manner and to provide the tunnel connection elements in a flexible manner or with an articulated connection so that the system housing elements can be adapted in a freely selectable manner to the course of a production hall. Consequently, the tunnel connection elements may be constructed to be curved in order to form a non-linear travel path or may be curved. Container guiding elements which can be coupled to each other or which merge into each other are arranged in the individual housing portions and/or tunnel connection elements—as already mentioned above—these may be rails or guiding elements or the like, in this instance all elements are included which can ensure a sufficiently precise guiding of containers or modules.

In principle, it is also conceivable in the context of a "two pipe tunnel" to provide a plurality of tunnels which are arranged in parallel or to provide inside a tunnel pipe "counter travel paths" which extend parallel with each other.

This facilitates organization of the transport and increases the transport speed and consequently shortens the transport times within the tunnel.

It is also possible to provide a branching tunnel which leads to a plurality of process stations or to a plurality of unpacking or handling stations.

In the same manner, it is conceivable to construct at least one process station and/or handling station and/or tunnel connection element as a reversal station so that a reversal loop is virtually formed for the container or module transport.

In the context of method claims, there is provision to ensure that a travel path which extends through the plurality of housing units of process and handling stations is not blocked by movable or parked containers, but instead the travel path is kept free to the greatest possible extent. The travel path may be a one-way travel path or may also be constructed as a two-way travel path.

The invention is explained in greater detail with reference to advantageous embodiments in the figures of the drawing, in which:

FIG. 5 is a schematic illustration of a system with a handling station and two process stations and a container magazine;

FIG. 6 is an illustration according to FIG. 5 in which the movement of the different containers is illustrated;

FIG. 7 is an illustration according to FIG. 1 in which the handling station and the process station are connected by means of a tunnel extension element;

FIG. 9 is a schematic illustration of a system in which three process stations are connected to a handling space in accordance with the tunnel principle.

Figure 1:
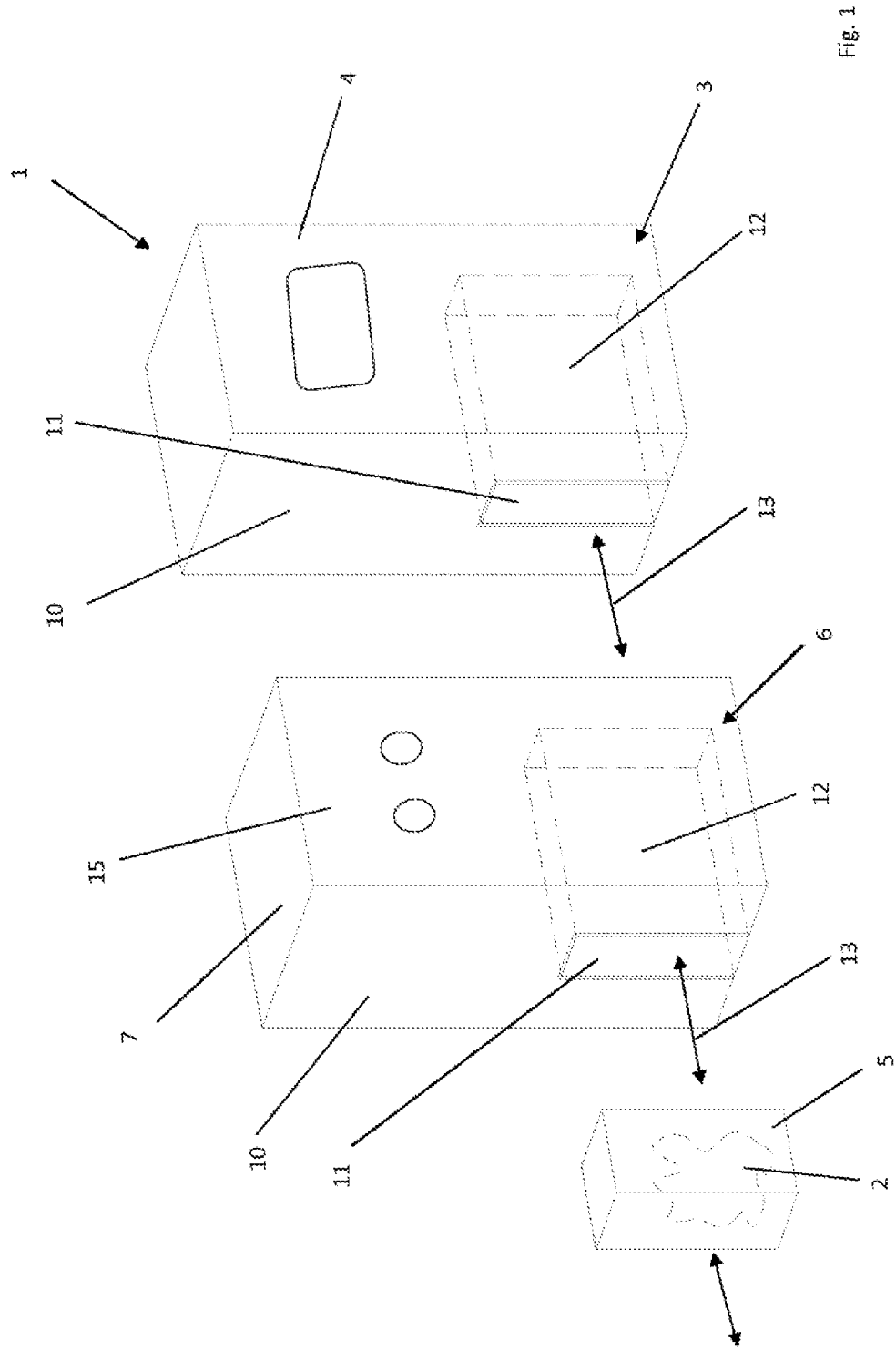
FIG. 1 shows a system according to the invention with a separately erected process station and handling station in each case and a travel path for containers which extends through a tunnel through the two system components.

The system 1 illustrated in the figures of the drawing serves to produce three-dimensional objects 2 by means of successive setting of layers of a construction material, which can be set by means of radiation, in particular laser radiation, at the locations which correspond to the respective cross-section of the object 2. Such a system 1 comprises at least one process station 4 which is arranged in a first housing 3 for carrying out the layered generative construction process in a construction container 5 and in at least a second housing 6 a handling station 7 for unpacking the produced objects 2 from the construction container 5, which can be displaced between the process station 4 and the handling station 7.

The at least one process station 4 and the at least one handling station 7 are arranged in separate housing units (3, 6) which can be erected separately or individually and which are provided in the embodiment in the side wall regions 10 with supply openings 11 and constructed so that they can form configuration which is placed one inside the other or partially separated at least one continuous tunnel 12 or a tunnel chain, wherein the tunnel 12 or the tunnel chain forms a travel path 13 for construction containers 5 and other displaceable containers, which travel path is integrated in the housing units 3, 6.

For the person skilled in the art, it is commonplace that there have to be integrated in the housing 3 of the process station 4 a large number of devices and apparatuses required to carry out the method, for example, radiation sources in the form of at least one laser, at least one scanning system, a process chamber, a metering chamber, an overflow chamber and the like. The handling station 7 comprises a glove box 15 with manual interventions so that within this glove box 15 the unpacking operation can be carried out. Furthermore, the handling station 7 may comprise a sieve module, by means of which clumps and melt residues can be removed from the already-used construction material.

Figure 2:
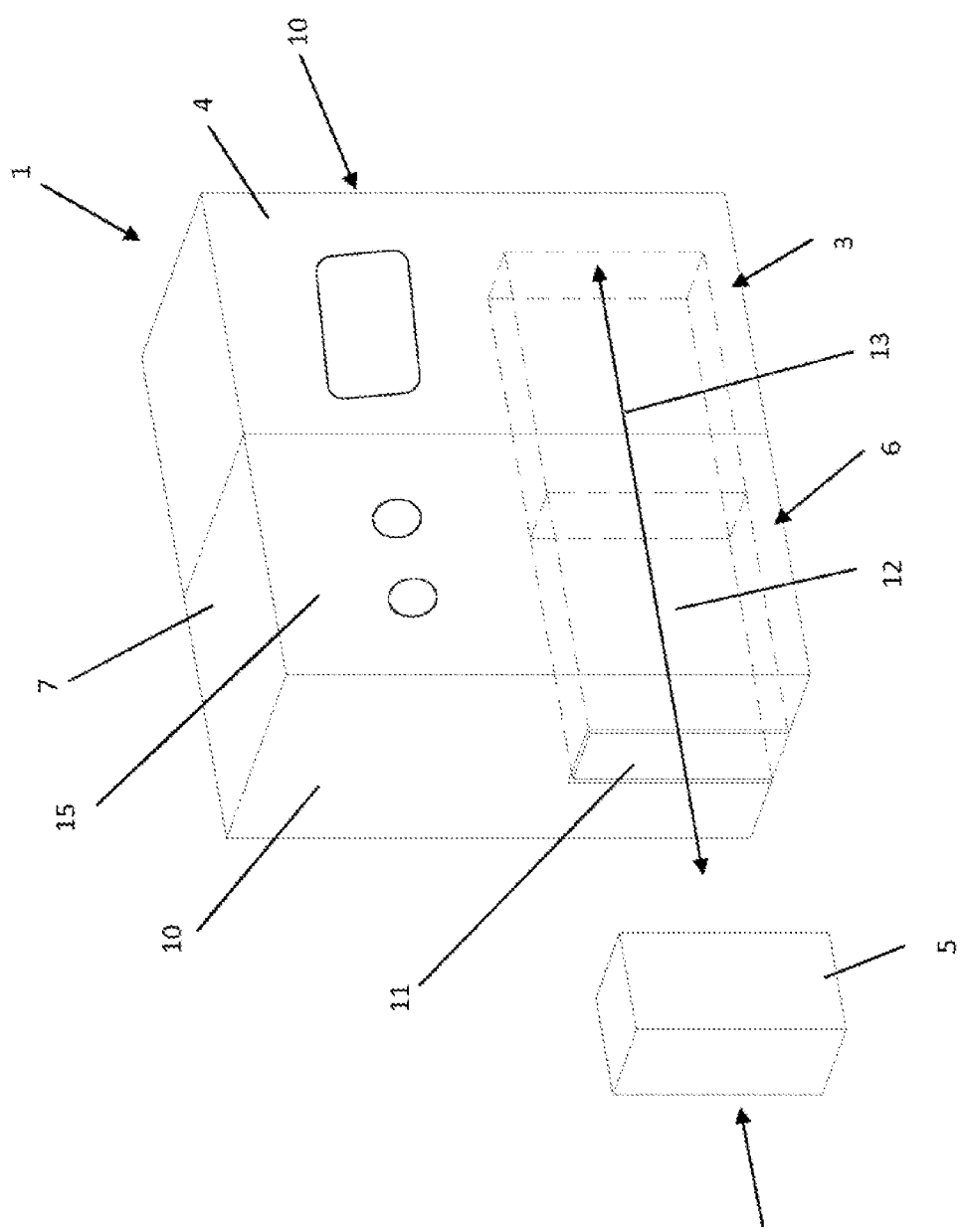
FIG. 2 shows a system according to the invention with a directly adjacent handling station and processing station and a tunnel which extends therethrough for transporting containers.

In FIG. 2, it can be seen that the two housings 3, 6 can also be placed directly one on the other. The supply openings 11 which are arranged in the side wall regions 10 are arranged in such a congruent manner that the continuous tunnel 12 according to the invention and travel path 13 can be formed.

Figure 3:
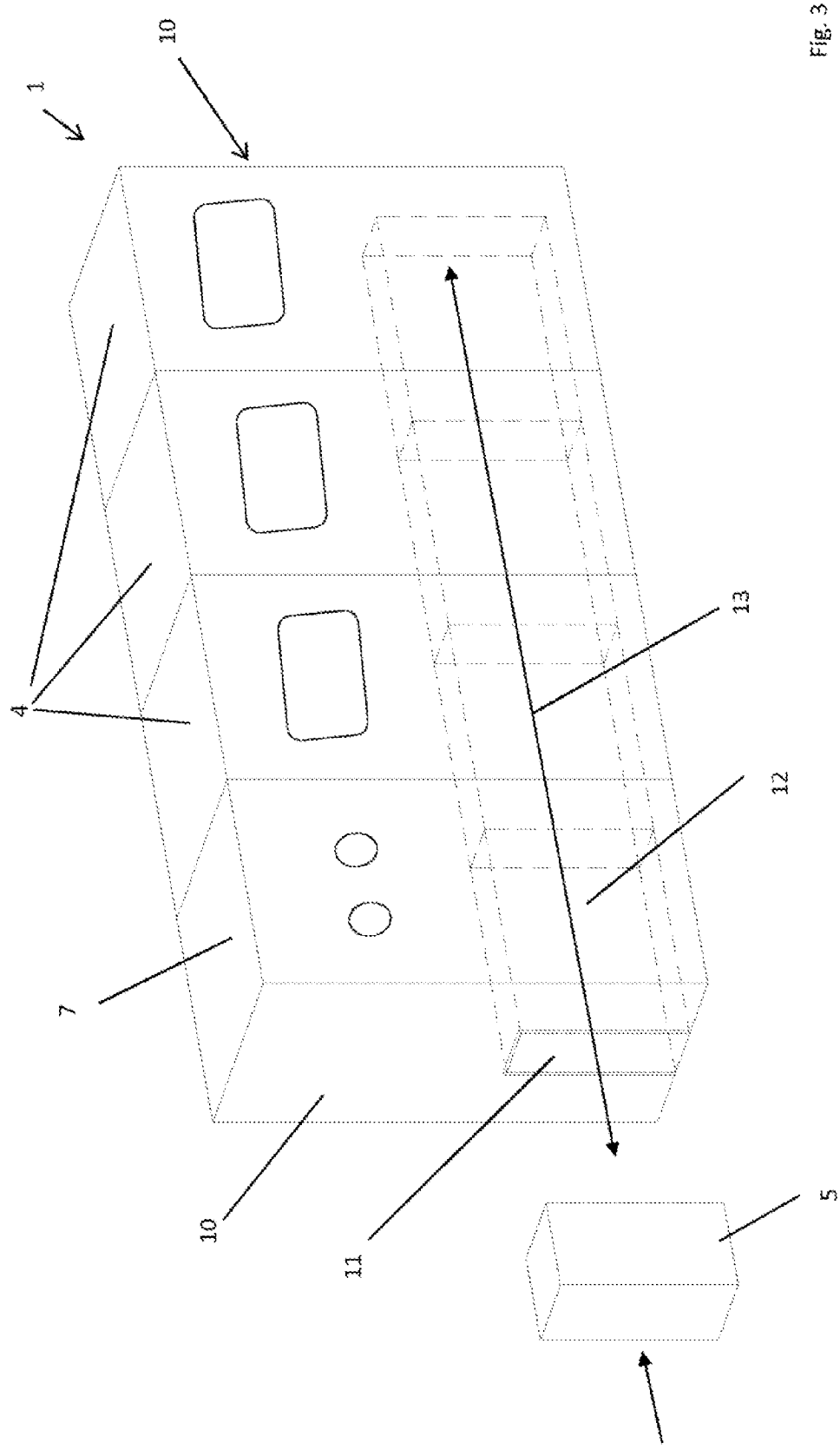
FIG. 3 shows a system having a handling station and, for example, three process stations for forming a production line with a tunnel arrangement according to the invention.

As can be seen in FIG. 3, a handling station 7 having a housing 6 may also be combined with a plurality of process stations 4 so that a production line is formed.

Figure 4:
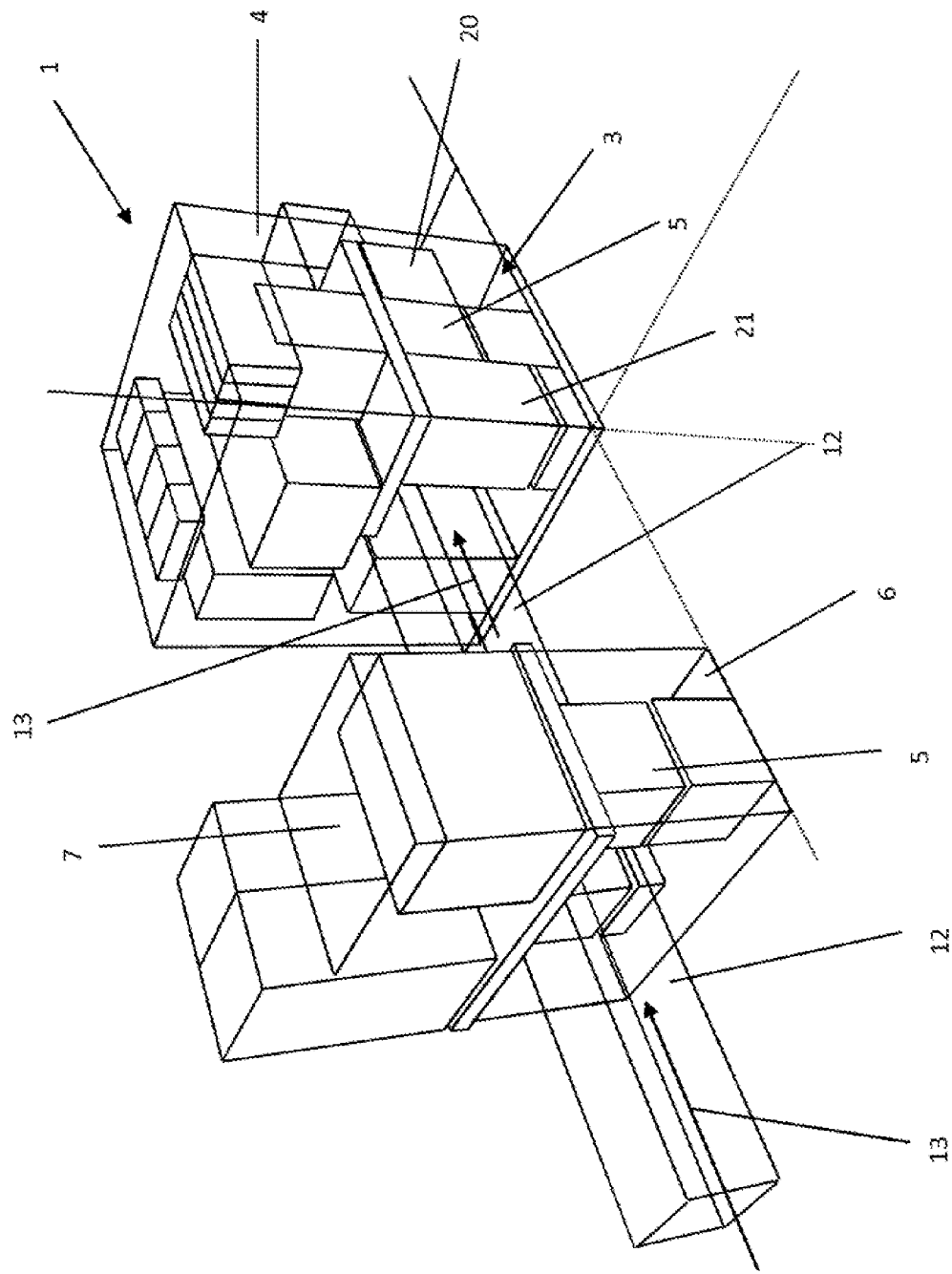
FIG. 4 is a schematic illustration of a handling station and a process station with tunnels which extend through both for transporting different containers.

In FIG. 4, it is illustrated how individual elements can be arranged inside the housing 3, 6 and how the tunnel 12 which extends therethrough moves with the travel path 13. It is significant that the tunnel 12 or the tunnel chain is provided in the inner region of the housing units 3, 6 with side niches or expansions 16 in which the displaceable containers 5 can be introduced in particular in an operating position or during a bypass operation for continuous release of the travel path 13 which extends in the tunnel 12 for additional displaceable containers 5. Additional displaceable containers 5 may be an overflow container 20, a metering container 21 or additional modules which are not illustrated in greater detail in the figures of the drawing, but instead may be constructed as a service module, as a cleaning module and the like.

Figure 8:
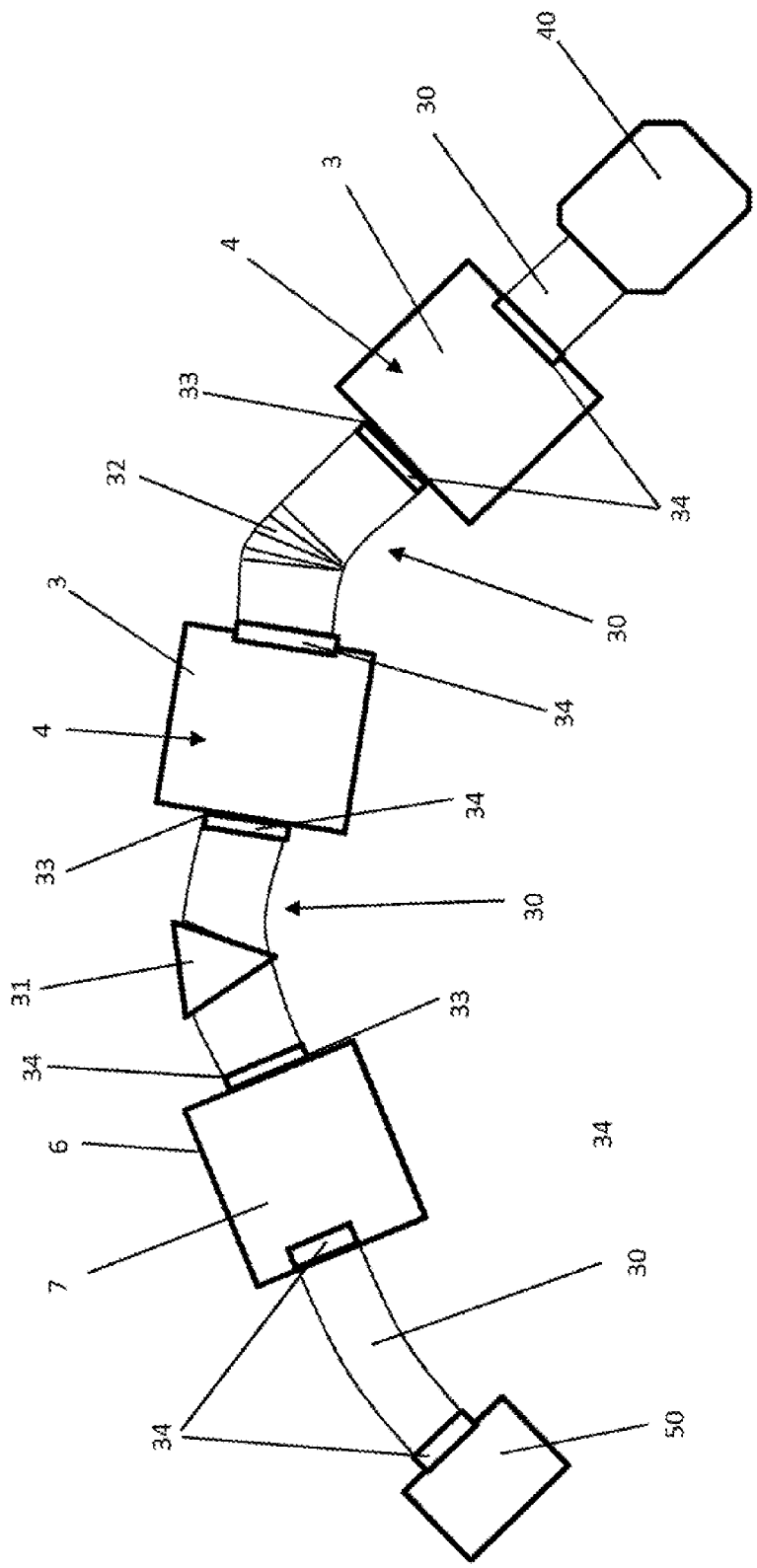
FIG. 8 is a schematic plan view of a system with a container magazine, a handling station, two process stations and a reversal station, wherein all the stations are connected by means of tunnel extension elements of different form.

In the embodiment illustrated in FIGS. 1-4, the tunnel 12 and consequently also the travel path 13 extend in a linear manner through the housing units 3, 6, but it is also possible to provide a curved tunnel path as may be produced, for example, by means of chamfering of the side wall regions 10 of the housing units 3, 6 or by means of tunnel connection elements 30 which are illustrated schematically in FIGS. 7 and 8. The tunnel connection elements 30 may either be constructed as linear connection boxes through which the tunnel 12 extends, but they may also be provided with wedge-like inserts 31 for forming a curved path of the tunnel connection elements 30. It is also possible to provide flexible portions 32 in the tunnel connection elements 30. The end regions 33 of the tunnel connection elements 30 may be provided with gas-tight flange-like connection units 34 which can be flange-mounted to the supply openings 11 in the side wall regions 10.

FIG. 8 shows another reversal station 40, this may be constructed in a similar manner to a tunnel portion and may be fitted to one end of the tunnel 12 which is produced. There would be conceivable as a reversal station a device which is constructed as a reversal loop for the containers 5 or modules which are intended to be transported.

In principle, it is also possible to construct the tunnel 12 as two pipes or at least to provide it with two opposing travel paths so that in a tunnel pipe two-way traffic is possible.

FIGS. 5 and 6 show another container magazine 50 which is connected to the tunnel arrangement where applicable in a gas-tight manner and in which different containers and/or modules can be held in readiness for sending into the tunnel 12.

FIG. 9 shows another system 1 in which a plurality of process stations 4.1, 4.2 and 4.3 are juxtaposed in accordance with the tunnel concept of the invention, wherein the process stations 4.1, 4.2 and 4.3 are arranged in separate first housings 3 and are connected to each other by means of tunnel connection elements 30.

At the left side of the drawing, there is illustrated another relatively large separate space 50 which may be constructed as a clean space, where applicable may be able to be made completely or partially inert and under some circumstances may even be able to be entered by an operator. A robot 51 can carry out preparatory or unpacking operating steps within this space on the construction container 5 which can be introduced into the inerted space 50 via a tunnel connection element.

It is also within the scope of the invention to provide such an inertable space 50 only for preparing the construction containers 5 and to arrange within the housing chain a handling station 7 in another housing, where only the components are then unpacked. It is further possible to provide in the inerted space 50 a container magazine 52 in which, for example, a plurality of prepared construction containers 5 may be provided for the construction process in the process stations 4. Of course, it is also possible to hold ready at that location other containers which have been prepared for the construction process, such as overflow containers 20 or metering containers 21 or service modules for use thereof in the system.

LIST OF REFERENCE NUMERALS

1 System
2 Object
3 First housing
4 Process station
5 Construction container
6 Additional housing
7 Handling station
10 Side wall region
11 Supply opening
12 Tunnel
13 Travel path
15 Glove box
16 Expansion
20 Overflow container
21 Metering container
30 Tunnel connection element
31 Insert
32 Flexible portion
33 End region of 30
34 Connection unit
40 Reversal station
50 Space
51 Robot
52 Containers

The invention claimed is:
1. An additive manufacturing system, comprising:
a tunnel chain, the tunnel chain comprising:
one or more supply openings configured to introduce a plurality of displaceable containers to the tunnel chain;

a plurality of tunnel portions integrated within respective ones of a plurality of housing units, the plurality of housing units comprising one or more process stations and/or one or more handling stations, the plurality of tunnel portions collectively defining a tunnel;

a transport path configured to transport the plurality of displaceable containers through the tunnel defined by the plurality of tunnel portions; and one or more expansion regions respectively configured to receive from the transport path a respective one of the plurality of displaceable containers while allowing one or more additional displaceable containers to move along the transport path past the respective one of the plurality of displaceable containers positioned in the one or more expansion regions, and to return the respective one of the plurality of displaceable containers to the transport path to follow the one or more additional displaceable containers that moved past the respective one of the plurality of displaceable containers along the transport path, wherein the one or more expansion regions respectively comprise a bypass station and/or an operating position of one of the one or more process stations and/or of one of the one or more handling stations;

wherein at least one of the plurality of housing units comprises at least one of the one or more expansion regions integrated within the respective one of the plurality of housing units.

2. The system of claim 1, wherein the one or more process stations and/or the one or more handling stations are configured to perform an additive manufacturing process comprising:

positioning displaceable containers in a container magazine and/or removing displaceable containers from the container magazine;

introducing displaceable containers into the tunnel chain and/or removing displaceable containers from the tunnel chain;

additively manufacturing objects within at least some of the plurality of displaceable containers using selective laser melting and/or selective laser sintering;

unpacking the objects from the displaceable containers used to additively manufacture the objects;

supplying fresh construction material and/or removing excess construction material; and/or performing service, cleaning, and/or measurements upon the one or more process stations and/or the one or more handling stations.

3. The system of claim 1, wherein respective ones of the one or more displaceable containers received in the one or more expansion regions are selected from the group consisting of: a construction container, a metering container, an overflow container, a transport module, a service module container, a milling heat module container, a cleaning module container, and a measurement module container.

4. The system of claim 1, comprising:

one or more tunnel connection elements respectively coupled to one or more of the supply openings and/or respectively disposed between adjacent ones of the plurality of housing units, wherein the tunnel defined by the plurality of tunnel portions is further defined by the one or more tunnel connection elements.

5. The system of claim 4, wherein respective ones of the one or more tunnel connection elements are flange-mounted to a corresponding one of the one or more supply openings and/or to a corresponding one of the plurality of housing units.

6. The system of claim 4, wherein respective ones of the one or more tunnel connection elements are selected from the group consisting of: a linear tunnel connection element, a wedge tunnel connection element, a flexible tunnel connection element, a branching tunnel connection element, and a reversal station tunnel connection element.

7. The system of claim 4, wherein at least one of the one or more tunnel connection elements comprises at least one of the one or more expansion regions.

8. The system of claim 1, comprising:

an inerted space operably coupled to the tunnel chain.

9. The system of claim 8, wherein the inerted space is configured to inertize displaceable containers to be introduced into the tunnel chain and/or to unpack components having been additively manufactured in a displaceable container, the displaceable container having been transported into the inerted space via the tunnel chain.

10. The system of claim 9, wherein the inerted space comprises a robot configured to carry out preparatory operating steps and/or unpacking operating steps.

11. The system of claim 1, comprising:

one or more container magazines configured to hold a plurality of displaceable containers to be introduced into the tunnel chain and/or having been removed from the tunnel chain.

12. The system of claim 1, respective ones of the one or more expansion regions are disposed laterally and/or vertically adjacent to a corresponding one of the plurality of tunnel portions.

13. The system of claim 1, wherein at least one of the plurality of housing units comprises at least one of the one or more expansion regions disposed above a corresponding one of the plurality of tunnel portions, wherein the at least one of the one or more expansion regions is configured to suspend above the corresponding one of the plurality of tunnel portions: a service module container, a milling head module container, a cleaning module container, and/or a measurement module container.

14. The system of claim 1, wherein the tunnel chain comprises an inlet, and an outlet and/or one or more closed ends, and wherein the tunnel chain is configured to maintain a protective atmosphere comprising an inert gas.

15. The system of claim 1, wherein the transport path comprises a linear transport path and/or a non-linear transport path.

16. The system of claim 1, wherein the tunnel chain comprises a plurality of transport paths.

17. The system of claim 1, wherein the tunnel chain comprises:

guiding elements configured to guide the plurality of displaceable containers along the transport path and/or between the transport path and the one or more expansion regions.

18. The system of claim 1, wherein the tunnel chain comprises:

a drive mechanism configured to move respective ones of the plurality of displaceable containers along the transport path and/or between the transport path and the one or more expansion regions; and/or a controller configured to control movements of respective ones of the plurality of displaceable containers along the transport path and/or between the transport path and the one or more expansion regions.

19. The system of claim 1, wherein the plurality of displaceable containers respectively comprise a self-drive mechanism, and wherein the plurality of displaceable containers are movable through the transport path and/or between the transport path and the one or more expansion regions by the respective self-drive mechanism.

20. A method of operating an additive manufacturing system, the method comprising:
- moving a plurality of displaceable containers through a tunnel chain, wherein the tunnel chain comprises:
  - one or more supply openings configured to introduce the plurality of displaceable containers to the tunnel chain;
  - a plurality of tunnel portions integrated within respective ones of a plurality of housing units, the plurality of housing units comprising one or more process stations and/or one or more handling stations, the plurality of tunnel portions collectively defining a tunnel;
  - a transport path configured to transport the plurality of displaceable containers through the tunnel defined by the plurality of tunnel portions; and
  - one or more expansion regions respectively configured to receive from the transport path a respective one of the plurality of displaceable containers while allowing one or more additional displaceable containers to move along the transport path past the respective one of the plurality of displaceable containers positioned in the one or more expansion regions, and to return the respective one of the plurality of displaceable containers to the transport path to follow the one or more additional displaceable containers that moved past the respective one of the plurality of displaceable containers along the transport path, wherein the one or more expansion regions respectively comprise a bypass station and/or an operating position of one of the one or more process stations and/or of the one or more handling stations wherein at least one of the plurality of housing units comprises at least one of the one or more expansion regions integrated within the respective one of the plurality of housing units; and wherein moving the plurality of displaceable containers through the tunnel chain comprise:
- moving a first one of the plurality of displaceable containers from the transport path to a first one of the one or more expansion regions;
- moving a second one of the plurality of displaceable containers along the transport path past the first one of the one or more expansion regions with the first one of the plurality of displaceable containers disposed in the first one of the one or more expansion regions; and
- after the second one of the plurality of displaceable containers moves past the first one of the one or more expansion regions, moving the first one of the plurality of displaceable containers out of the first one of the one or more expansion regions in order to follow the second one of the plurality of displaceable containers along the transport path.

* * * * *